(12) United States Patent
Alalawi

(10) Patent No.: US 9,384,679 B2
(45) Date of Patent: Jul. 5, 2016

(54) SYSTEM, METHOD AND COMPUTER PROGRAM PRODUCT TO ASSIST THE VISUALLY IMPAIRED IN NAVIGATION

(71) Applicant: Ishraq Alalawi, Niagara Falls, NY (US)

(72) Inventor: Ishraq Alalawi, Niagara Falls, NY (US)

( * ) Notice: Subject to any disclaimer, the term of this patent is extended or adjusted under 35 U.S.C. 154(b) by 616 days.

(21) Appl. No.: 13/676,560

(22) Filed: Nov. 14, 2012

(65) Prior Publication Data

US 2014/0132388 A1 May 15, 2014

(51) Int. Cl.
*G09B 21/00* (2006.01)

(52) U.S. Cl.
CPC .................... *G09B 21/003* (2013.01)

(58) Field of Classification Search
CPC ............ A61H 3/061; A61H 2003/063; A61H 2201/5058; A61H 3/068; A61H 2201/5064; A61H 2201/5069; A61H 2201/5023; A61H 3/00; Y10S 135/911; G01S 17/42; G01S 15/04; G01S 17/06; G01S 15/88; G01S 13/88
USPC .......................... 340/1.1, 4.1, 4.12, 4.13, 4.14
See application file for complete search history.

(56) References Cited

U.S. PATENT DOCUMENTS

| | | | |
|---|---|---|---|
| 5,973,618 A | 10/1999 | Ellis | |
| 6,298,010 B1 * | 10/2001 | Ritz | A61H 3/061 367/116 |
| 6,356,210 B1 * | 3/2002 | Ellis | A61H 3/061 135/67 |
| 6,671,226 B1 * | 12/2003 | Finkel | A61H 3/061 367/116 |
| 7,486,386 B1 * | 2/2009 | Holcombe | G01C 3/08 356/4.01 |
| 7,706,212 B1 | 4/2010 | Campbell | |
| 7,778,112 B2 * | 8/2010 | Behm | A61H 3/061 135/911 |
| 8,952,796 B1 * | 2/2015 | Wolf | G06F 3/016 340/407.1 |
| 9,037,400 B2 * | 5/2015 | Tolstedt | A61H 3/061 701/411 |
| 2009/0234576 A1 * | 9/2009 | Ou | A61H 3/061 701/533 |
| 2010/0007474 A1 * | 1/2010 | Behm | A61H 3/061 340/407.1 |
| 2010/0097200 A1 * | 4/2010 | Hilsebecher | G01S 7/412 340/436 |
| 2010/0100013 A1 * | 4/2010 | Hu | A61H 3/00 600/595 |
| 2010/0146459 A1 * | 6/2010 | Repka | G06F 3/0488 715/863 |
| 2012/0119920 A1 * | 5/2012 | Sallop | A43B 3/0005 340/686.6 |

FOREIGN PATENT DOCUMENTS

| | | |
|---|---|---|
| CN | 200984304 | 12/2007 |
| CN | 201019982 | 2/2008 |
| CN | 201453580 | 5/2010 |
| CN | 201624952 | 11/2010 |
| WO | 2012/040703 | 3/2012 |

OTHER PUBLICATIONS

Radar for the Blind, Kenneth Chee, et al.; Computer Engineering Program, California Polytechnic State University, San Luis Obispo, CA (4 pages).

* cited by examiner

*Primary Examiner* — An T Nguyen
(74) *Attorney, Agent, or Firm* — Oblon, McClelland, Maier & Neustadt, L.L.P.

(57) ABSTRACT

A system, method and computer program product that provides tactile feedback to assist a visually impaired person in navigation and avoid collisions with obstacles (objects). The system comprises a pressure based tactile response device and a remote control device. The pressure based tactile response device comprises of a pressure pad which includes a plurality of pressure modules that provide a haptic response to the visually impaired person. With a feedback mechanism the pressure based tactile response device provides navigational information to the impaired person and ensures that collisions with obstacles are avoided. The remote control device comprises a plurality of sensors which enable the impaired person to locate the pressure based tactile response device when it is not in his possession.

14 Claims, 10 Drawing Sheets

SYSTEM, METHOD AND COMPUTER PROGRAM PRODUCT TO ASSIST THE VISUALLY IMPAIRED IN NAVIGATION

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

1. Field of the Disclosure

The present disclosure relates to a system, method and a computer program product regarding mechanisms and methods that assist visually impaired people to navigate in a safe manner without colliding with objects or other people in their path.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventionally, visually impaired people (e.g., blind people) use various tools to assist them in navigating through their daily lives. For example, a mechanism commonly used is a long stick to tap in front of them to identify obstacles while they are walking. However, depending upon the environment in which the impaired person navigates, the probability of collision with a stationary as well as a non-stationary object increases dramatically. This can lead to a very unpleasing experience for the impaired person.

Further, impaired persons do not benefit from visual clues for detecting objects in their path and frequently depend on other people for assistance. Also, if the stick used for navigation by the impaired person is somehow misplaced, it leaves the impaired person in a state of helplessness wherein either the person depends upon assistance from other people to locate the stick or is faced with the challenging task of locating the stick by himself through a trail and error process.

SUMMARY

In light of the above observations made by the present inventor, a system, method and a computer program product are provided that assist a visually impaired person to detect in advance the presence of obstacles in their path and navigate through a certain environment in a safe manner, avoiding collisions with objects. A combination of sensors and tactile response mechanisms are used to provide tactile information to the visually impaired person to assist them in knowing if objects (moving and stationary) lie in their path and how they can circumvent these obstacles in a safe manner. Also, the mechanism optionally provides feedback information, notifying the visually impaired person if they are within a certain distance from imminent obstacles and guides them in a manner such that they can avoid a head-on collision with the object. This assists the visually impaired person in knowing the amount by which they need to change their direction of navigation until they pass the obstacles. Furthermore, the system also assists the visually impaired person (via a set of voice commands) to locate the stick when it is not in his possession. Hence the impaired person is not dependant on the assistance from other people to locate his cane. The present invention is aimed at making the lives of the visually impaired people simpler and providing them with a fulfilling and independent experience.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
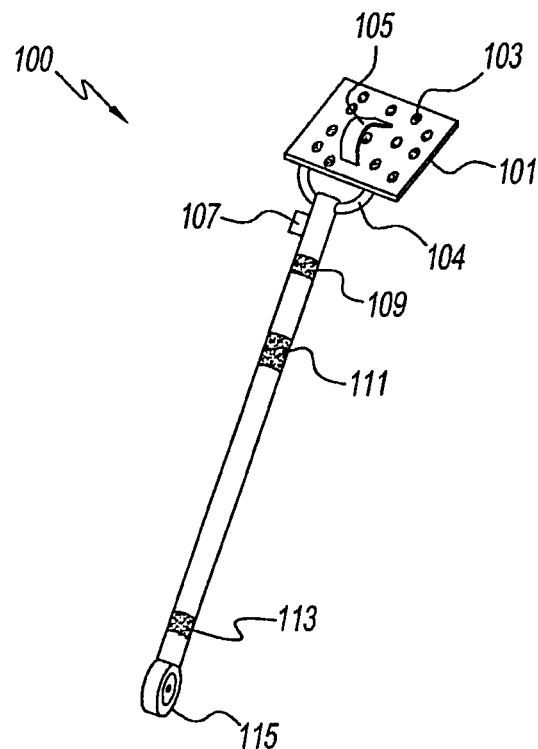
FIGS. 1A and 1B depict a diagram of a system that comprises a pressure-based cane tactile response device and a cane remote control device respectively.

Referring now to the drawings, like reference numerals designate identical or corresponding parts throughout the several views.

FIG. 1A is a profile view of a pressure-based cane tactile response device 100. The device 100 is intended to be used by a person with visual impairment, perhaps even legally blind. The device 100, comprises of a docket stand 104, disposed at one end of the cane (stick) and a wheel 115 disposed at the other end of the cane. Note that the wheel allows for easy maneuverability of the device 100. A rectangular pressure pad 101 is mounted on the docket stand and serves to provide the tactile response to the user. The pressure pad 101, comprises a plurality of pressure modules arranged in a matrix form on the pressure pad. The activation of pressure modules provides a tactile response to the user and notifies the presence of objects in the path of the user. An adjustable strap 105 provides a firm grip around the user's hand which is placed on the pressure pad 101.

The cane 100, has a plurality of sensors disposed along its length. A heat sensor 113, is disposed above the wheel and notifies the user of the presence of potentially harmful hot objects (such a fire) that may be in its path. Note that the heat sensor 113, need not necessarily be placed at this specific position, but assuming normal operation of the device 100, the heat sensor is best located as close as possible to the wheel, thereby allowing early detection of harmful objects.

The pressure-based cane tactile response device 100 includes a radar based sensor 111, disposed midway along the length of the cane. The radar sensor detects the presence of objects (stationary and non-stationary) in a region that is set by the user (to be discussed) and notifies the user of potential obstacles. Note that the radar based sensor need not be located exactly midway along the length of the cane. However, for an unobstructed view the radar should be placed away from the docket stand 104. The radar based sensor detects objects in the region, and issues a tactile response to the users hand (placed on the pressure pad 101) in the form of pressure via the pressure modules 103. Note that the use of the pressure pad in the present invention is twofold: first it used to notify the user of imminent obstacles in its path. This can be achieved by the application of pressure for a certain time (to be set by user) to the corresponding pressure modules 103. This notification via the pressure modules can be in form of a short lived pulse. Secondly, the pressure pad can be used to direct the user to change his direction when it encounters an obstacle (to be discussed). This can be achieved by the application of a continuous pressure to the corresponding pressure modules 103, thus notifying the user in which direction he should move in order to avoid collision with the obstacle.

The pressure-based cane tactile response device includes an antenna 107, which interfaces with the cane remote control device when the system operates in a locate mode. Upon receiving instructions from the remote control transmitter the pressure-based cane tactile response device initiates a series of infrared transmissions, through the infrared (IR) transmitter 109. This forms a communication medium between the two devices of the system and aids the impaired person to locate the cane (to be discussed).

Figure 1B:
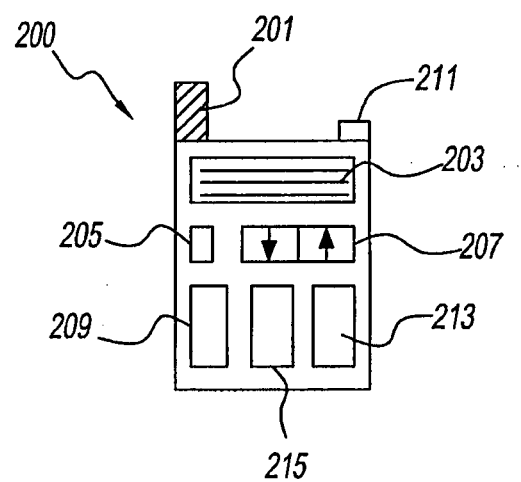

FIG. 1B depicts the cane remote control device 200, which includes an antenna (transmitter) 201, which interfaces with the pressure-based cane tactile response device 100. The remote control also includes an IR detector 211, to detect the IR transmissions from the pressure-based cane tactile response device when the system operates in locate mode. Depending upon the strength of the received IR transmissions, a set of directions can be read out to the impaired person via the speakers 203, and help the user locate the misplaced cane. In another embodiment of the invention, proximity sensors 213, can be used to aid the visually impaired person locate the pressure-based cane tactile response device. The device 200, includes a power ON/OFF button 205, and a locate button 209, which can initiate the locate process in the event the cane is misplaced. Finally the remote control device 200, includes a set of volume control buttons 207 that aid the impaired person to adjust the volume of the speakers 203.

Figure 2:
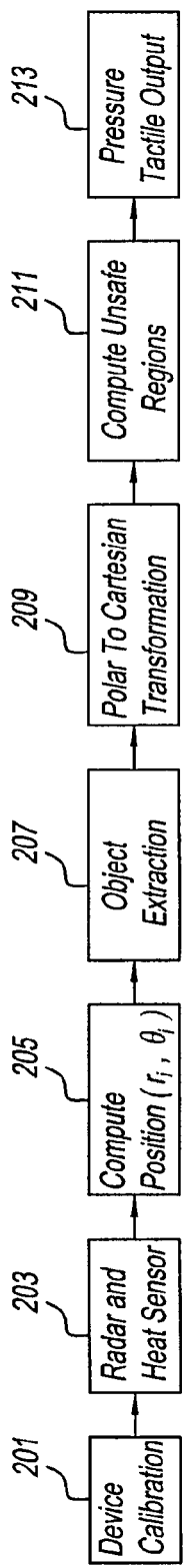
FIG. 2 is a block diagram depicting the various steps of a signal processing portion of the pressure-based cane tactile response device.

FIG. 2 is a block diagram of signal processing components employed in the pressure-based cane tactile response device 100, which may be located in a separate module integrated into the cane.

Device 100 is first calibrated with user settings (to be discussed) to determine the region of object (obstacle) detection. The radar based sensor 111 and the heat sensor 119 detect the presence of obstacles in a region determined by the calibration unit. A processing unit 205, computes the position of the detected obstacles and passes this information to the object extraction unit 207. The object extraction unit extrapolates the positions of the obstacles and eliminates the obstacles that lie outside the detection region. The calculated positions of the obstacles in the detection region are transformed to a Cartesian coordinate system to match the rectangular pressure pad 101. This enables the processor to stimulate the appropriate pressure modules to aid the impaired person identify the location of obstacles that lie in the detection region. Upon successful co-ordinate computations of the obstacles in the detection region, the processor computes the unsafe regions in unit 211. The unsafe regions are those that need to be avoided by the visually impaired person in order to avoid collisions with the objects. The impaired person is notified about the presence of the computed unsafe regions via a pressure based tactile output 213. The pressure based tactile output includes the application of a small amount of pressure (preset by the user) to the corresponding pressure modules of the pressure pad. Note that in the event of multiple obstacles in the detection region, the impaired person can be notified about their presence in a sequential manner. In a preferred embodiment, the user can be notified about the presence of an obstacle only when he is at a certain preset distance (activation distance) away from the obstacle.

In another embodiment, the user can be notified of the nearest obstacle in the detection region first, then the second nearest obstacle can be notified and this process continues until all obstacles have been notified to the user. Note that for the notification of each obstacle, a small amount of pressure in the appropriate modules can be activated for a small amount time which is predetermined by the user.

Figure 3:
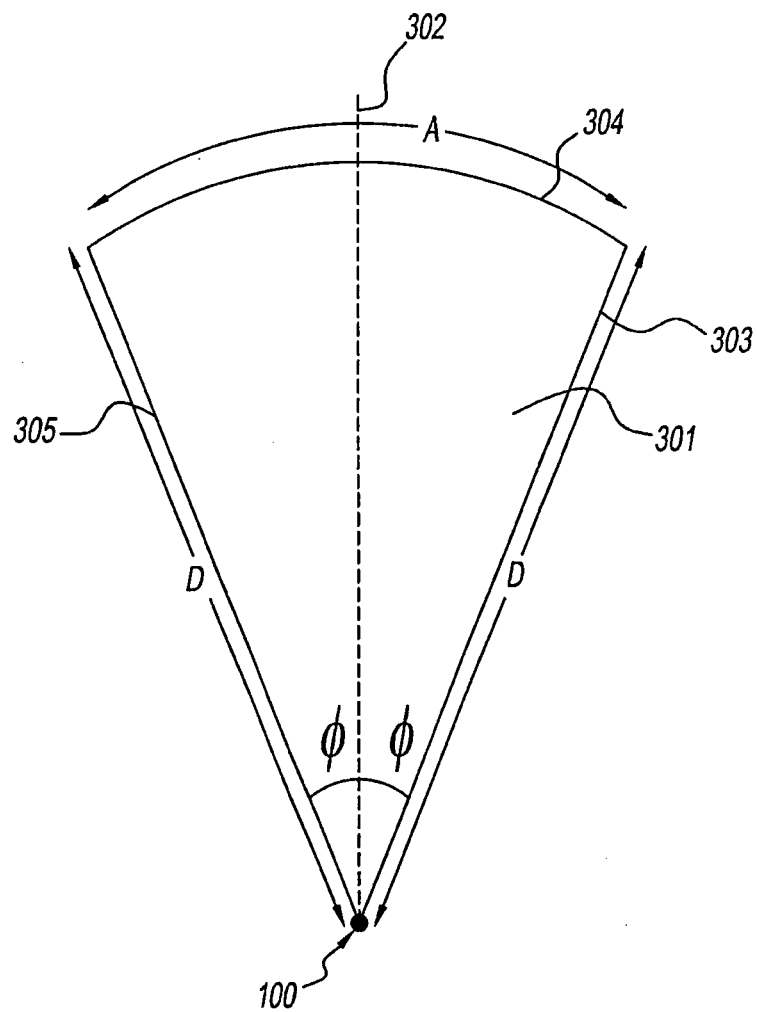
FIG. 3 is an exemplary layout of how the pressure-based cane tactile response device forms a region of object detection.

FIG. 3 depicts the calibration settings for determining the region of detection 301. The parameters used in determining the detection region are:

D: radial distance $\Phi$: central angle

The region of detection is defined by the boundaries 303 and 305, each of which are of length D as specified by the user and the arc length 304. The central angle is the angle formed by the vertical line of reference 302 and the boundary 303 (or 305). Given the radial distance and the central angle, the arc length (A) 304 can be calculated as follows:

$$A = D \cdot (2\Phi) \quad (1)$$

In Tables I and II, we depict the calculations for the arc length for various values of the central angle. In Table I, we set the radial distance D=3 meters and in Table II, we set the radial distance to 6 meters. Note that the central angle in Tables I and II is expressed in units of radians.

SAMPLE TABLE I: Radial Distance (D) = 3 meters

| D = 3 meters | | | | | | |
|---|---|---|---|---|---|---|
| $2\phi$ | $\pi/6$ | $\pi/4$ | $\pi/2$ | $2\pi/3$ | $5\pi/6$ | $\pi$ |
| A: | $\dfrac{\pi}{2}$ | $\dfrac{3\pi}{4}$ | $\dfrac{3\pi}{2}$ | $2\pi$ | $5\pi/2$ | $3\pi$ |

| SAMPLE TABLE II: Radial Distance (D) = 6 meters | | | | | | |
| --- | --- | --- | --- | --- | --- | --- |
| D = 6 meters | | | | | | |
| 2φ | π/6 | π/4 | π/2 | 2π/3 | 5π/6 | π |
| A: | π | 3π/2 | 3π | 4π | 5π | 6π |

Figure 4:
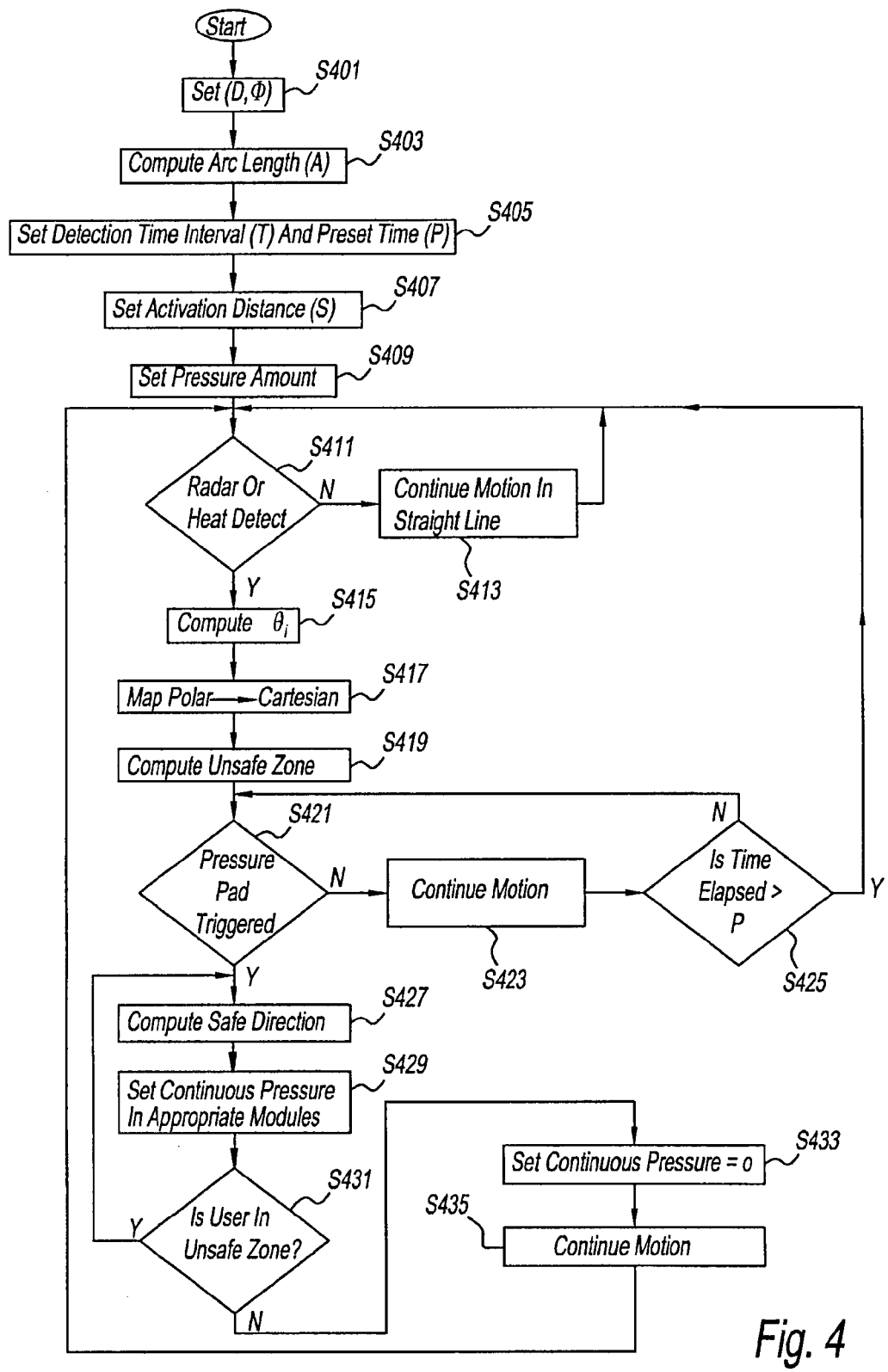
FIG. 4 is a flowchart showing a system level method used by the pressure-based cane tactile response device to provide tactile instruction to the user to assist in object detection and navigation.

FIG. 4 is a flowchart of the process performed in the pressure-based cane tactile response device 100. The process begins in step S401 where a user calibrates the device by setting the values of the radial distance and the central angle. In step S403, the arc length (A) is calculated by equation (1). In doing so, the user sets the region of detection 301.

In step S405, the user inputs the values of the detection time interval (T) and the preset time interval (P). The detection time interval represents the periodic amount of time after which the radar and heat sensor are activated to detect for the presence of objects in the set detection region. The preset time interval is helpful in scenarios wherein the heat/radar based sensors may have detected the presence of an object(s) in the detection region. However, the pressure pad 101, may not have been triggered as the detected object(s) may not be directly in the path of the user or the user may be at a distance greater than the activation distance away from the object. In this case the preset time (discussed in Step S425) may be used to reset the system.

In step S407, the user sets an activation distance S and sets the amount of pressure to be applied to the pressure modules 103, in step S409.

After the calibration steps are completed, the process then proceeds to step S411 where a query is made regarding whether the radar sensor or the heat sensor have detected the presence of objects/obstacles in the detection region 301. If the response to the query is negative, the user continues motion normally as shown in step S413 after which the process loops back to step S411 to check is the sensors have detected any objects in the detection region. However, if the response to the query in step S411 is affirmative, the process moves to step S415 wherein the bearing angles (θ's) are computed for each obstacle detected in the region.

In step S417, the computed bearing angles are transformed to the Cartesian coordinates and unsafe regions within the detection area are computed in step S419. The precise computations of the bearing angles and the mapping to the Cartesian coordinate system is explained later with reference to FIGS. 5 and 6.

In step S421 a query is made whether the pressure pad 101 is triggered thereby indicating the presence of an obstacle in the vicinity of the user. If the response to the query is negative the user continues motion (step S423) and then another query is made step S425 as to whether the time elapsed from the onset of the detection of the object(s) via sensors is greater than the preset time (P). If the response to the query is negative, the process loops back step S421 to check if the pressure pad is triggered. Note that the pressure pad is triggered only when the user is at a distance (the activation distance S) away from the obstacle. If the response to the query in step S425 is affirmative, the process loops back to step S411, wherein the sensors are checked for the detection of objects in the detection region.

In step S421, is the response is affirmative the process moves to step S427 where safe directions are computed that aid the user in navigation.

In step S429, based on the location of the user with respect to the obstacle the pressure pad is set to operate in a continuous mode, wherein pressure is applied continuously to the pressure modules indicating the direction in which the user should navigate to avoid the obstacle. The computation of the safe region and how the pressure pad aids in navigating the user from the obstacle in explained later with reference to FIG. 7.

In step S431, a query is made whether the user is in an unsafe zone. If the response to the query is affirmative the process goes to step S427 where safe directions are further computed. Hence the pressure-based cane tactile response device operates in a feedback manner, wherein based on the location of the user with respect to the obstacle, a haptic response (in the form of a pressure) is applied to the user which aids the person to avoid obstacles in its path.

If the user is not in an unsafe region, the process moved to step S433 wherein the continuously applied pressure is set to zero (S433) and finally in step S435 user continues motion in a normal manner. Subsequently the process return to step S411 wherein the process to detect newer obstacles in a detection area is continued.

Figure 5:
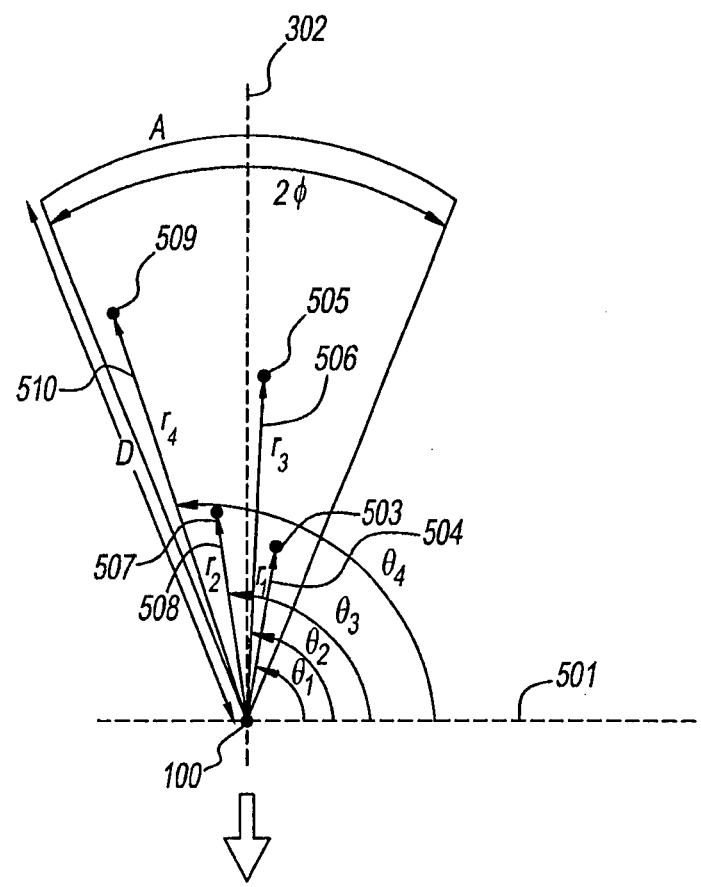
FIG. 5 is a first exemplary scenario wherein the pressure-based cane tactile response device detects discrete objects and converts the detected objects from a polar co-ordinate system to a Cartesian co-ordinate system.
Figure 5:
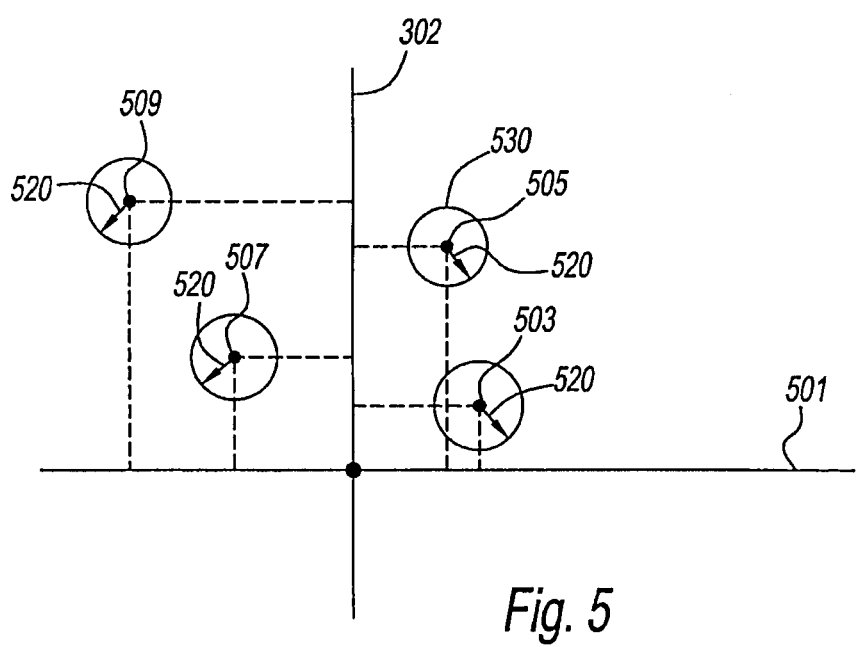

FIG. 5 provides an example scenario where the pressure-based cane tactile response device detects the presence of discrete objects in the detection region. Four obstacles labeled 503, 507, 505 and 511 are detected in the region. Axis 501, represents the horizontal reference axis and computations are made pertaining to the angles $\theta_i$'s that the detected objects make with the axis 501 and also their radial distance represented by $r_i$ from the user 100 are computed. The computation of θ and r for each detected object aids in mapping the detected objects in a rectangular Cartesian coordinate system. The x and y coordinates of the detected objects in the Cartesian coordinate system can be computed as follows:

$$x = r \cos(\theta) \quad (2)$$

$$y = r \sin(\theta) \quad (3)$$

Note that in the Cartesian coordinate system the detected objects are represented by the position coordinates x and y. Also included around each detected object is a circle of radius s. This radius s, 520, signifies the activation distance. More precisely, by setting a circle of radius s around each detected object, allows the user for early detection of the object and the user does not run the risk of suddenly colliding into an object. This also provides the controller (to be discussed) sufficient computation time to compute the safe zones in the detection region and notify the user of any action to be taken in advance.

Figure 6:
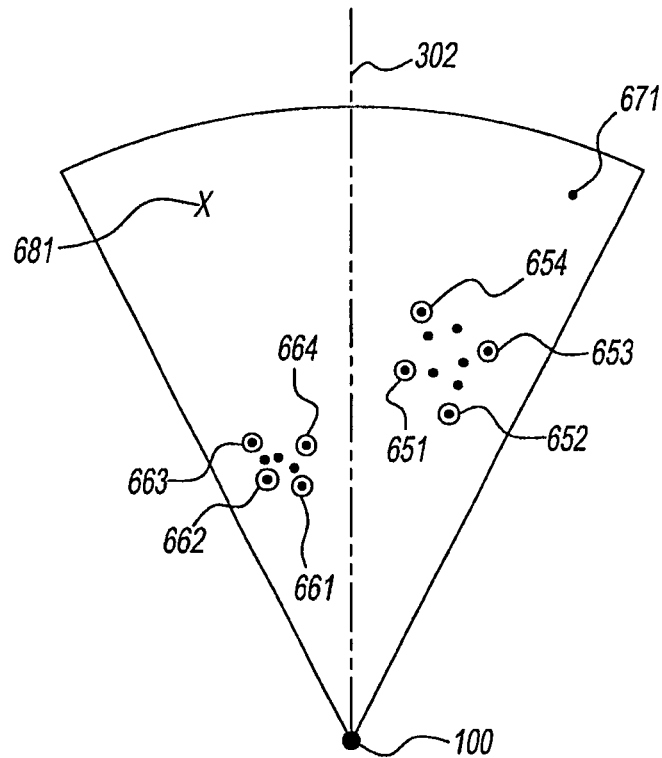
FIG. 6 is a second exemplary scenario wherein the pressure-based cane tactile response device detects regions of discrete objects and converts the detected regions from a polar co-ordinate system to a Cartesian co-ordinate system.
Figure 6:
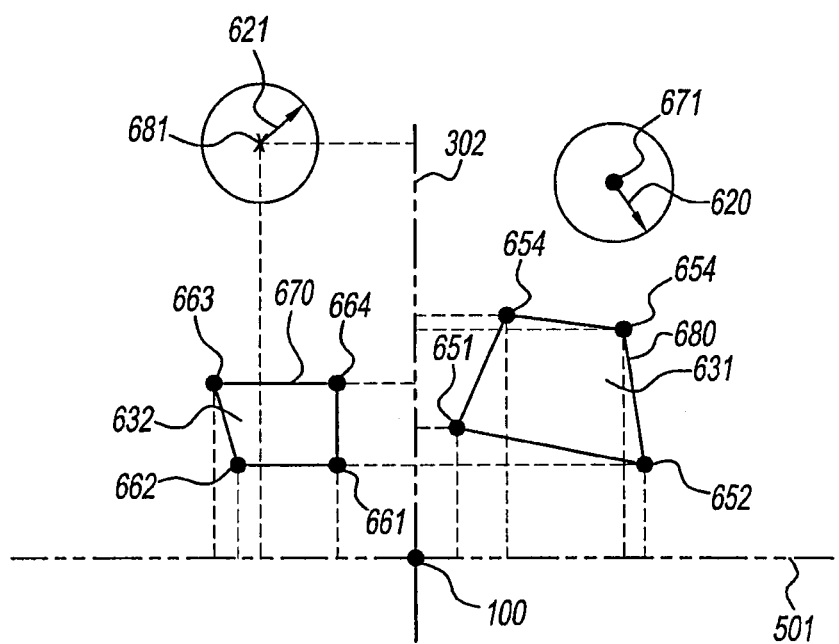

FIG. 6 provides another example scenario where the pressure based tactile response device detects the presence of a region of objects. Note that if multiple objects are located within close proximity of one another, the controller may be overloaded by the computations of the positions of each of the obstacles. Further, it will be difficult for a user to navigate through a group of obstacles which are located in close proximity of one another. Hence in this case, the controller computes regions which may be deemed as unsafe for the user and navigates the user around such regions.

FIG. 6 depicts two regions of objects located to the left and right of the user. The outermost four objects within each of these regions are labeled 661-664 and 651-654. Furthermore, the figure also depicts a single discrete object 671 and the presence of a hot object body 681. The mapping of the discrete object 671 and the hot body 681 follow the mechanism outlined in FIG. 5. Note however that the radius of the circle around the hot object body can be set to be equal to the activation distance s (as for the discrete body) or be set to a value greater than s. For mapping the two regions of objects in the Cartesian coordinate system we take into account only the outermost four objects within the region and map their positions using formula (2) and (3). In doing so, we obtain different shapes 670 and 680 for the two regions. Note that for the discrete body we get a circle with radius s and for the hot object body we result in a circle with radius greater than equal to s. These serve as the unsafe regions which are to be avoided by the user.

Figure 7A:
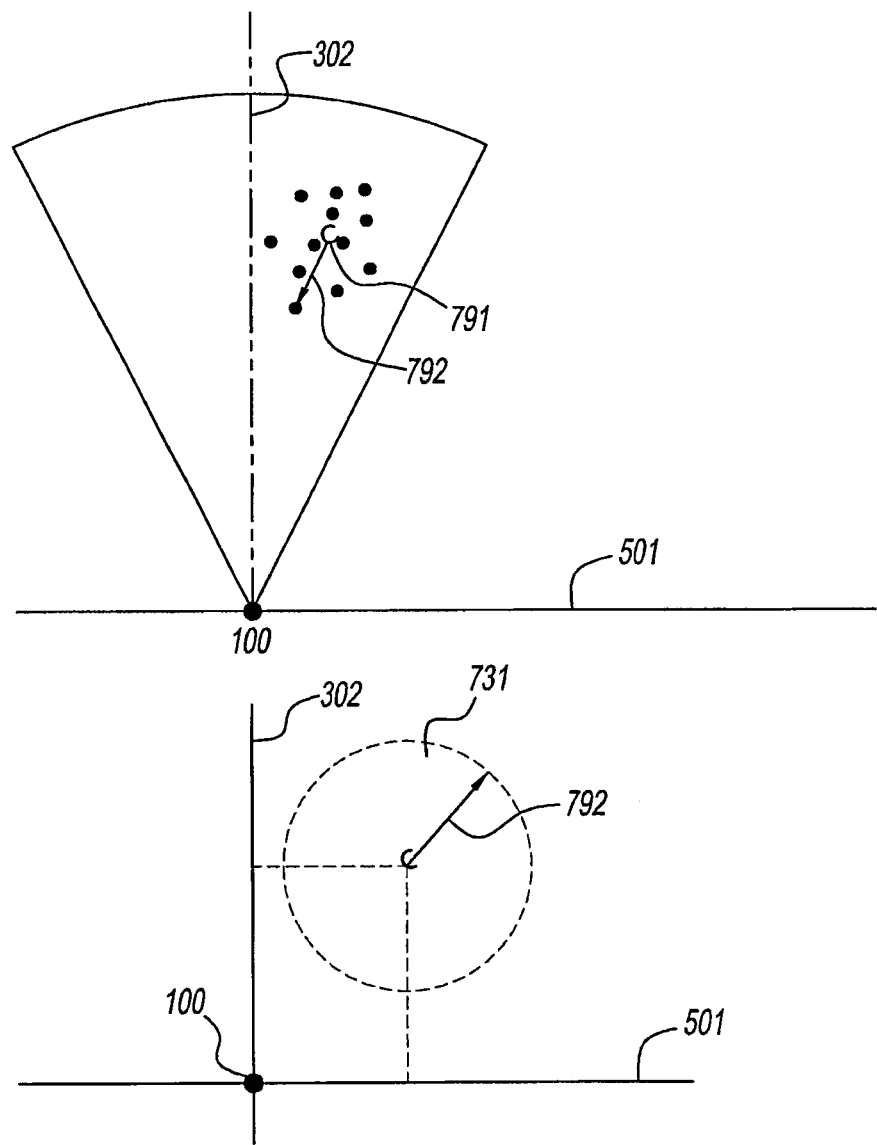
FIG. 7A is a third exemplary scenario wherein the pressure-based cane tactile response device detects the centroid of a region of discrete objects and converts the detected regions from a polar co-ordinate system to a Cartesian co-ordinate system.

FIG. 7A depicts another mechanism of representing a group (region) of discrete objects. For a given region of discrete objects in the detection area, the controller computes the centroid of the region 791 and also the distance 792, to the object that is furthest away from the centroid. On mapping 791 and 792 in the Cartesian coordinate system, we result in a region 731 deemed unsafe for the user which has a radial length equal in magnitude to that of 792. As mentioned previously, the use of the pressure pad is to indicate to the user via a tactile response the presence of an obstacle. This tactile response is short lived in time and can be programmed by the user. Since this form of tactile response is only to notify the user of imminent obstacles, the user can program the device to apply only a short amount of pressure in the corresponding pressure modules. As explained below, the pressure pad is also used in a continuous mode, where in it provides a continuous tactile response to the user which helps in navigation in a manner such that the user avoids collisions with the obstacles.

Figure 7B:
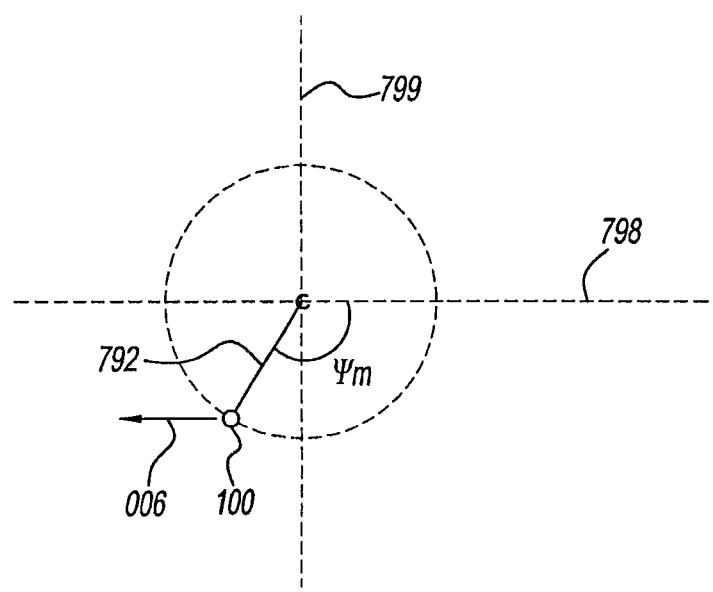
FIG. 7B depicts the scenario wherein the impaired user comes in contact with an unsafe region.

FIG. 7B depicts the scenario wherein the user has just entered an unsafe region. As shown in the figure, first the angle $\Psi_m$ is computed. This is the angle between the line 792 and the horizontal reference axis 798. Note that the line 792 is a line connecting the position of the user (on the circumference of the circle) and the center of circle. This is dependant on the exact position at which the user enters the unsafe region.

Based on this position, computations of $\Psi_m$ are performed and based on the following conditions a decision is made as to whether the user has to move left or right to avoid the unsafe region:

If $\Psi_m > \Pi/2$ then move left $\Psi_m < \Pi/2$ then move right       (4)

As shown in FIG. 7B, in this example as $\Psi_m > \Pi/2$ a decision is made to move left in the direction represented by 006. Hence the appropriate pressure modules of the pressure pad are activated in a continuous manner until the user has moved away from the unsafe region. Once the user has avoided the unsafe region, the continuous pressure applied to the pressure modules can be set to zero and the user can continue motion is a straight line motion (normal fashion).

Figure 8:
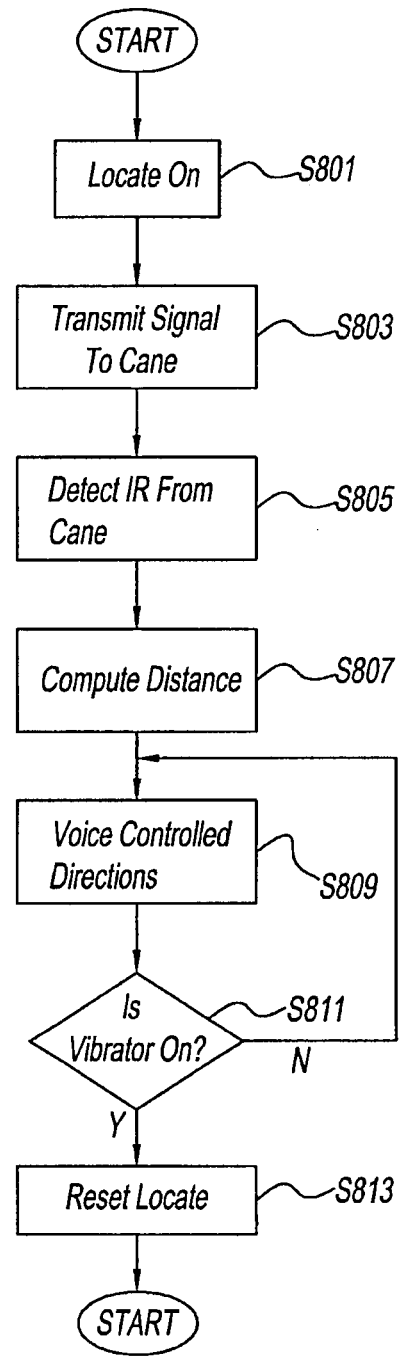
FIG. 8 is a is a flowchart showing a system level method used by the remote control to locate the pressure-based cane tactile response device.

FIG. 8 is a flowchart of the process performed by the cane remote control device 200. This device interfaces with the pressure-based cane tactile response device 100, to locate the cane when it is not in possession of the user.

The process begins in step S801, wherein the user activates the locate cane process by pressing the locate button 209 on device 200.

In step S803, a signal is transmitted via the antenna 201 of the remote control device, to the pressure-based cane tactile response device 100 and is received by its antenna 107. Upon successful completion of this communication medium between the two devices, the cane utilizes its infrared transmitter 109 and transmits IR signals which are intercepted by the IR detector 211 (step S805).

In step S807 a processor computes the distance as to how far away is the cane located from the user. Note that such computations can take into account the magnitude of the received IR transmissions.

In step S809, a series of voice controlled directions are submitted to the user. The directions enable the user to navigate to the cane in a safe manner. In another embodiment of the present invention, a proximity sensor 213 can be utilized to enable the impaired person to navigate to the cane.

In step S811, a query is made whether the vibrator 215 is activated. If the response to the query is affirmative, it signifies that the user has located the cane and the process proceeds to step S813, wherein the locate process is reset.

If the response to the query in step S811 is negative the process loops back to step S809, wherein further controlled directions based on the location of the user are computed that enable the user to locate the cane.

Figure 9:
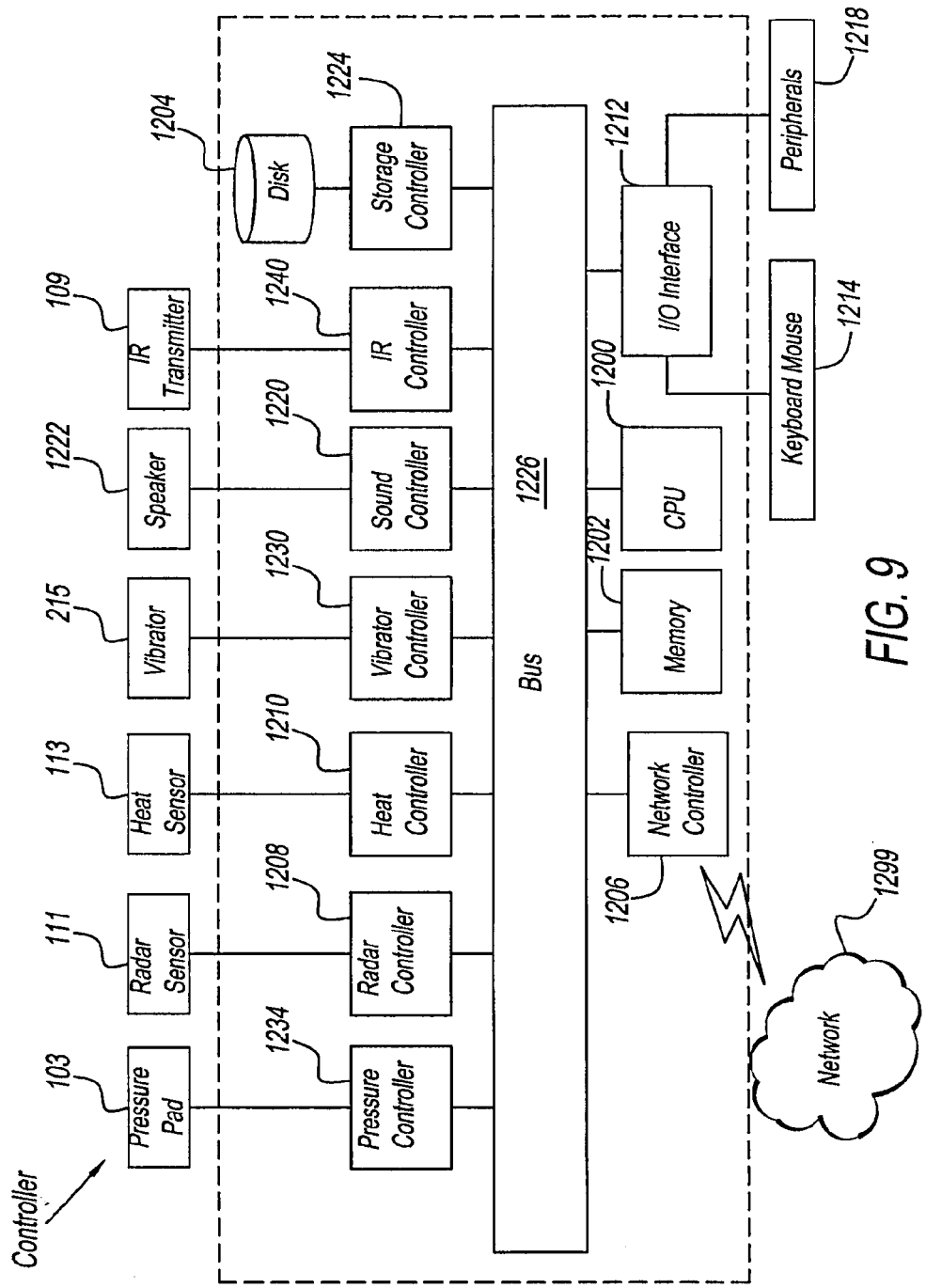
FIG. 9 is an exemplary computer processor based device that may be used either directly, or remotely, to assist in the processing of different processes employed by the pressure-based cane tactile response device and the remote control.

FIG. 9 is a block diagram of a controller which may be used to perform the above-described processes of the cane system which comprises the pressure-based cane tactile response device and the cane remote control device. A hardware description of the controller according to exemplary embodiments is described with reference to FIG. 9.

In FIG. 9, the controller includes CPU1200 which performs the process described above. The processed data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which cane system comprising of devices 100 and 200 communicate such as a server or computer.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The controller in FIG. 9 also includes a network controller 1206, such as an Intel Ethernet PRO network interface card from Intel Corporation of America, for interfacing with network 1299. As can be appreciated, the network 1299 can be a public network, such as the Internet, or a private network such as an LAN or WAN network, or any combination thereof and can also include PSTN or ISDN sub-networks. The network 1299 can also be wired, such as an Ethernet network, or can be wireless such as a cellular network including EDGE, 3G and 4G wireless cellular systems. The wireless network can also be WiFi, Bluetooth, or any other wireless form of communication that is known.

A general purpose I/O interface 1212 interfaces with a keyboard and/or mouse 1214 as well as to a variety of peripherals 1218 including printers and scanners, such as an OfficeJet or DeskJet from Hewlett Packard. The keyboard 1214 may be a Braille keyboard, thus enabling the user to manually input the calibration parameters such as the radial length, central angle, activation distance, detection time interval and the preset time.

A sound controller 1220 is also provided in the controller, such as Sound Blaster X-Fi Titanium from Creative, to interface with speakers/microphone 1222 thereby providing sounds and/or music. The speakers/microphone 1222 can also be used to accept dictated words as commands for controlling the controller or for providing location and/or property information with respect to the target property. The speakers/microphone 1222 may be used in the process of providing navigation instructions via the cane remote control 200.

The general purpose storage controller 1224 connects the storage medium disk 1204 with communication bus 1226, which may be an ISA, EISA, VESA, PCI, or similar, for interconnecting all of the components of the cane based system.

A radar controller 1208 is provided to interface with the radar based sensor 111. On receiving instructions from the CPU 1200, the radar controller will calibrate the radar sensor with information pertaining to the radial distance, the central angle and form the detection region for the device 100.

A heat controller 1210 is provided to interface with the heat sensor 113 of the pressure-based cane tactile response device 100. The heat controller can be used to set the sensitivity of the heat sensor thereby enabling the sensor to detect the presence of a hot object above a certain threshold temperature value.

A vibrator controller 1230 is provided to adjust the vibration frequency of the vibrating unit 215 of the cane remote control 200. Also provided is a pressure controller 1234, which interfaces with the pressure modules 103 and controls the amount of pressure applied to provide a tactile response to the user. Finally, an infrared (IR) controller 1240 is provided that interfaces with the IR transmitter 109 of the pressure based cane tactile response device and controls the magnitude of IR transmissions when the system operates in the locate mode. Note that the IR controller can also interface with the IR detector 211 of the cane remote control and control the sensitivity of the detector wherein the detector detects IR transmissions above a certain threshold.

A description of the general features and functionality of the keyboard and/or mouse 1214, as well as the storage controller 1224, network controller 1206, sound controller 1220, and general purpose I/O interface 1212 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method of providing a tactile response comprising:
    computing, by a processing circuit, a detection region based on a radial distance and a central angle;
    calibrating a pressure based tactile response device with a plurality of calibration parameters;
    detecting a plurality of objects within the detection region by a plurality of sensors disposed on the pressure based tactile response device, the plurality of objects including moving objects and stationary objects;
    computing, by the processing circuit, for each detected object of the plurality of objects, a bearing angle and a distance the detected object is disposed from the pressure based tactile response device;
    calculating a plurality of unsafe regions based on the computed bearing angles and distances, each unsafe region having a radius that is determined based on a number of detected objects included in the unsafe region; and
    triggering, in one of a first mode of operation and a second mode of operation of the pressure based tactile response device, a plurality of pressure modules disposed on the pressure based tactile response device, to provide a tactile indication to a user of the tactile response device, the triggering being initiated based on the user approaching the unsafe region.

2. The method of providing a tactile response according to claim 1, further comprising:
    computing, by the processing circuit, an arc length based on the radial distance and the central angle.

3. The method of providing a tactile response according to claim 1, further comprising:
    computing by the processing circuit, for each detected object of the plurality of objects, a transformation of the bearing angle and the distance to a cartesian coordinate system.

4. The method of providing a tactile response according to claim 1, wherein the detecting further includes detecting a hot object by a heat sensor of the plurality of sensors, and detecting the stationary objects and the moving objects by a radar sensor of the plurality of sensors.

5. The method of providing a tactile response according to claim 1, wherein calibrating the pressure based tactile response device includes setting a detection time interval calibration parameter, and an activation distance calibration parameter.

6. The method of providing a tactile response according to claim 5, wherein the detection time interval calibration parameter is a periodic amount of time after which the plurality of sensors disposed on the pressure based tactile response device are activated to detect object positions within the detection region.

7. The method of providing a tactile response according to claim 5, wherein the activation distance calibration parameter corresponds to a minimum distance that the pressure based tactile response device is disposed from the detected stationary object in order to trigger a tactile response.

8. A non-transitory computer readable medium having stored thereon a program that when executed by a computer causes the computer to execute a method of providing a tactile response comprising:
    computing a detection region based on a radial distance and a central angle;
    calibrating a pressure based tactile response device with a plurality of calibration parameters;
    detecting a plurality of objects within the detection region by a plurality of sensors disposed on the pressure based tactile response device, the plurality of objects including moving objects and stationary objects;
    computing, for each detected object of the plurality of objects, a bearing angle and a distance the detected object is disposed from the pressure based tactile response device;
    calculating a plurality of unsafe regions based on the computed bearing angles and distances, each unsafe region having a radius that is determined based on a number of detected objects included in the unsafe region; and triggering, in one of a first mode of operation and a second mode of operation of the pressure based tactile response device, a plurality of pressure modules disposed on the pressure based tactile response device, to provide a tactile indication to a user of the tactile response device, the triggering being initiated based on the user approaching the unsafe region.

9. The method of providing a tactile response according to claim 1, wherein the radius of an unsafe region of the plurality of unsafe regions has a magnitude equal to an activation distance calibration parameter set by the user of the pressure based tactile response device, based on the unsafe region including a single detected object.

10. The method of providing a tactile response according to claim 1, wherein based on an unsafe region of the plurality of unsafe regions including at least two detected objects, the radius of the unsafe region has a magnitude equal to a distance measured from a centroid of the unsafe region to the detected object belonging to the unsafe region that is disposed furthest away from the centroid.

11. The method of providing a tactile response according to claim 10, wherein the pressure based tactile response device operates in the first mode of operation based on the user of the pressure based tactile response device being disposed away from the centroid of the unsafe region by a distance greater than the radius of the unsafe region.

12. The method of providing a tactile response according to claim 10, wherein the pressure based tactile response device operates in the second mode of operation based on the user of the pressure based tactile response device being disposed on a circumference of the unsafe region.

13. The method of providing a tactile response according to claim 1, wherein in the first mode of operation of the pressure based tactile response device, the triggering is performed by applying a first pressure pulse having a first time duration to the plurality of pressure modules.

14. The method of providing a tactile response according to claim 13, wherein in the second mode of operation of the pressure based tactile response device, the triggering is performed by applying a second pressure pulse to the plurality of pressure modules, the second pressure pulse having a second time duration that is greater than the first time duration.

* * * * *